US012789342B1

(12) United States Patent
Maresh

(10) Patent No.: US 12,789,342 B1
(45) Date of Patent: Nov. 10, 2026

(54) MULTI-PURPOSE TOOL HAVING LOCKABLE HANDLES

(71) Applicant: Joseph D Maresh, West Linn, OR (US)

(72) Inventor: Joseph D Maresh, West Linn, OR (US)

(*) Notice: Subject to any disclaimer, the term of this patent is extended or adjusted under 35 U.S.C. 154(b) by 373 days.

(21) Appl. No.: 18/211,276

(22) Filed: Jul. 19, 2023

Related U.S. Application Data

(60) Provisional application No. 63/576,510, filed on Feb. 14, 2023, provisional application No. 63/576,135, filed on Jan. 18, 2023.

(51) Int. Cl.
*B25F 1/00* (2006.01)
*B25F 1/04* (2006.01)
*B25G 3/38* (2006.01)

(52) U.S. Cl.
CPC ................ *B25F 1/003* (2013.01); *B25F 1/04* (2013.01); *B25G 3/38* (2013.01)

(58) Field of Classification Search
CPC .. B25B 7/18; B25B 7/14; B25B 7/123; B25B 7/10; B25F 1/003
USPC ................................................................ 7/128
See application file for complete search history.

(56) References Cited

U.S. PATENT DOCUMENTS 2,397,095 A * 3/1946 Emmett .................. B25B 13/14 7/125
3,564,694 A * 2/1971 Millheiser ............. B25B 27/205 81/336
8,919,228 B1 * 12/2014 Gao ....................... A61B 17/00 81/335

* cited by examiner

*Primary Examiner* — Tom Rodgers
(74) *Attorney, Agent, or Firm* — Nick A Nichols, Jr.

(57) ABSTRACT

A multi-purpose tool may include a pair of handles and a pair of interconnected jaws coupled to the handles. Latching racks may be rotatably connected proximate to distal ends of the pair of handles. The latching racks may include asymmetric teeth cooperatively engaging under tension at a negative pressure angle. In a locking configuration, outward flex of the handles forces the latching racks into locking engagement. In an unlocked configuration, the latching racks may be stowed in the handles.

18 Claims, 14 Drawing Sheets

110
112
114
120
122
144
136
140
141
146
138

134
132
200
126

122
120
214
216
212
210
218
141
110
140
112
110
112
114
126
124
132
132
122
124
120
126
214
216
210
216
210
220
218
218
141
141
212
140
140

MULTI-PURPOSE TOOL HAVING LOCKABLE HANDLES

CROSS-REFERENCE TO RELATED APPLICATION

This application claims priority to and the benefit of the filing date of U.S. Provisional Application Ser. No. 63/576,135, filed Jan. 18, 2023, and U.S. Provisional Application Ser. No. 63/576,510 filed Feb. 14, 2023, which applications are herein incorporated by reference in their entirety.

BACKGROUND

The present application relates to improvements in multi-purpose tools. More specifically, the present application relates to a multi-purpose tool including locking handles. Multi-purpose tools provide a wide range of functionality in a single tool thereby reducing the need to carry different tools to perform various functions. Multi-purpose tools typically include two handles, such as but without limitation, pliers. Multiple tools or implements may be pivotally attached to the handles that may be used to perform various tasks. U.S. Pat. No. 4,238,862 discloses a multi-purpose tool manufactured by Leatherman Tool Group, Inc., typical of such prior art tools.

SUMMARY

A multi-purpose tool may include a pair of handles rotatably secured to a pair of interconnected jaws. A latching rack may be rotatably connected to each of the handles. The latching racks may include asymmetric teeth cooperatively engaging under tension at a negative pressure angle. In a locked configuration, outward flexing of the handles forces the latching racks into locking engagement. In an unlocked configuration, the latching racks may be stowed in the handles.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

Figure 1:
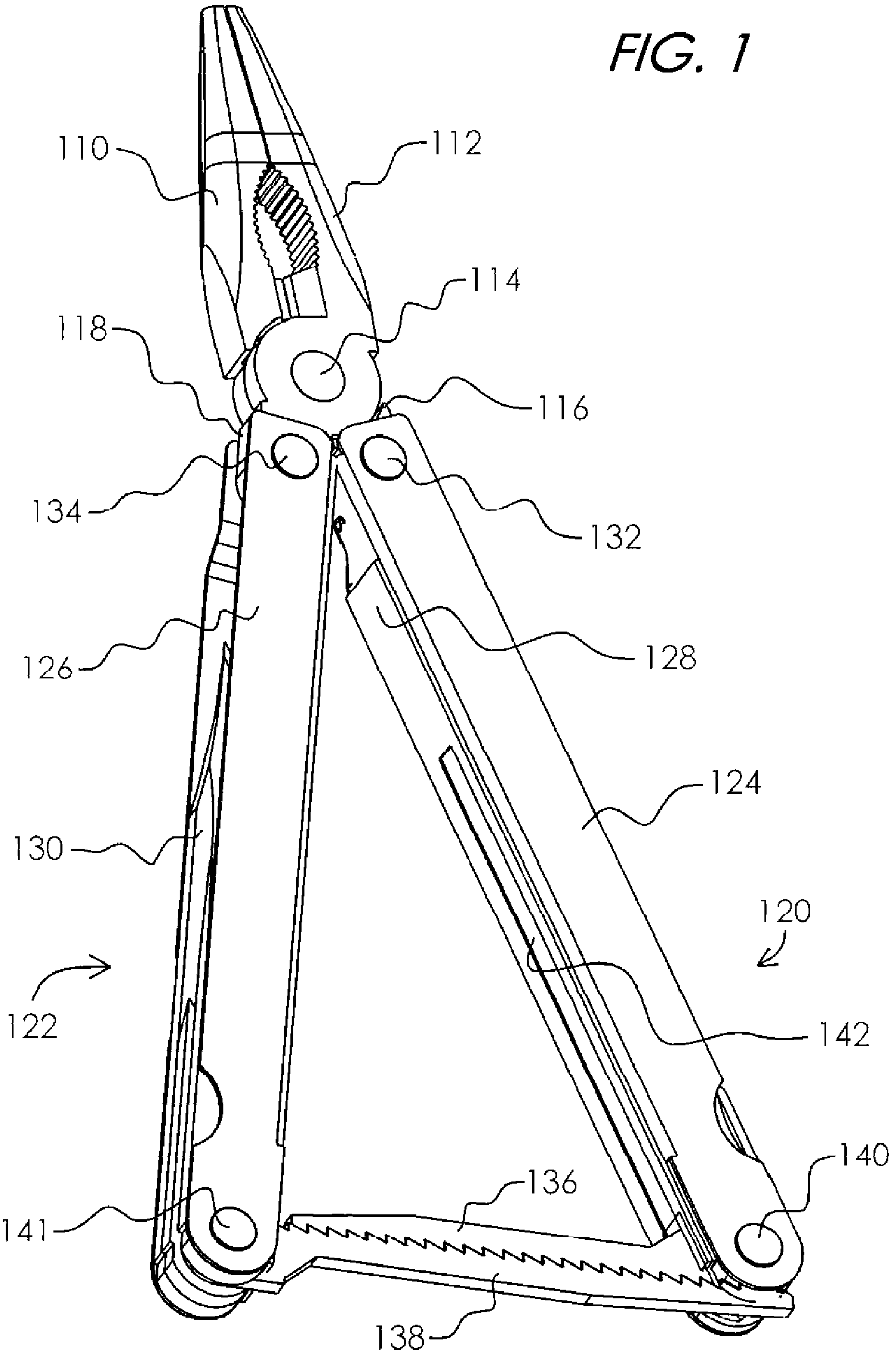
FIG. 1 is a perspective of a multi-purpose tool.
Figure 2:
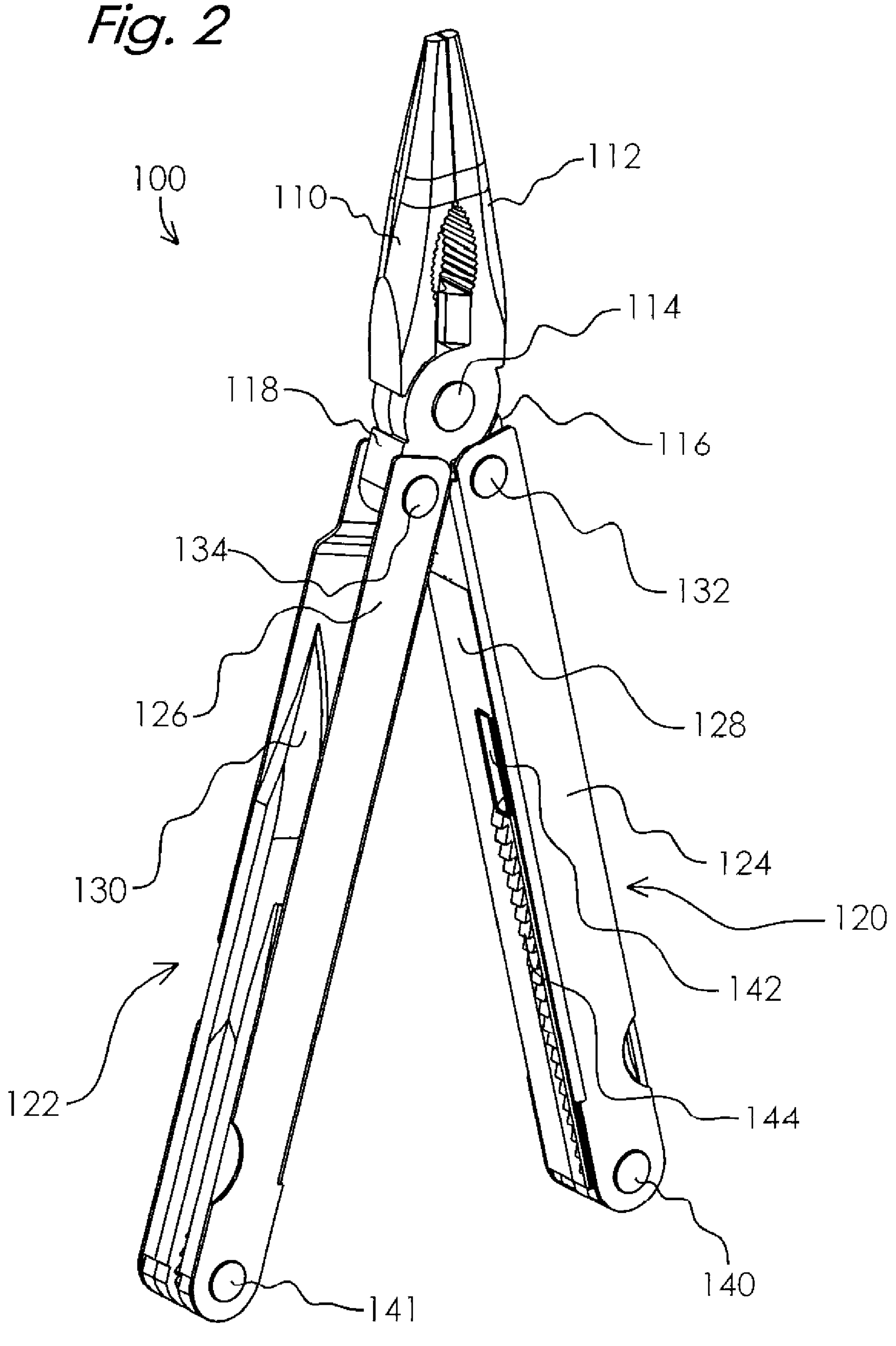
FIG. 2 is a perspective view of the multi-purpose tool shown in FIG. 1 depicting the tool in an unlocked configuration.

Referring first to FIG. 1, a multi-purpose tool according to a first embodiment is generally identified by the reference numeral 100. The multi-purpose tool 100, depicted for illustrative purposes but without limitation, as needle nose pliers (hereinafter referred to as "pliers"), may include pliers jaws 110 and 112 pivotally connected by a transverse pivot shaft 114. The jaws 110, 112 may include shank ends 116, 118, respectively. The pliers 100 may include a first handle 120 and a second handle 122. The handles 120, 122 may include sidewalls 124 and 126, respectively, extending upwardly from opposite edges of a bottom wall 128, defining outwardly facing longitudinal channels 142. Multiple accessory tools, such as but without limitation, a knife blade 130 may be stowed in the channel of either handle 120, 122. The first handle 120 may be rotatably secured to pliers jaw 110 at joint 132, and the second handle 122 may be rotatably secured to pliers jaw 112 at joint 134. Latching racks 136 and 138 may be pivotally connected proximate to the distal ends of the handles 120, 122 at pivot shafts 140 and 141, respectively. The latching racks 136, 138 may comprise a planar body including asymmetric rack teeth 144 and 146 along an edge of the planar body, respectively. The latching racks 136, 138 may be stowed within channels 142 formed in the handles 120, 122. In the stowed configuration, the rack teeth 144 may be flush with the open end of the channel 142 in the handle 120. The rack teeth 146 may be directed toward the bottom wall 128 of the channel 142 in the handle 122.

The latching racks 136, 138 may be deployed by the user rotating them about pivot shafts 140, 141, respectively, to a generally laterally aligned interlinked orientation. Thrust washers, for example but without limitation, concentric with the pivot shafts 140, 141, may facilitate lateral alignment and interlinking of the rack teeth 144, 146. Additionally, but without limitation, a magnet may be incorporated in one or both of the latching racks 136, 138 to promote lateral alignment. Upon squeezing the handles 120, 122 to clamp onto an object, the handles 120, 122 flex toward each other and the latching racks 136, 138 advance in opposite directions relative to one another. Upon clamping the plier jaws 110, 122 onto the object, the squeezing force applied to the handles 120, 122 may be relaxed permitting the handles 120, 122 to unflex forcing the rack teeth 144, 146 into locking engagement. The tensile load applied to the latching racks 136, 138 is unidirectional. The asymmetric profile of the rack teeth 144, 146 establishes a negative pressure angle of contact between rack teeth 144 and 146. In FIG. 5B, a negative pressure angle A20 of about 115 degrees is illustrated. The locking force is in the direction of arrow LF. The base P and height H of the rack teeth 144, 146 are equal.

Figure 3:
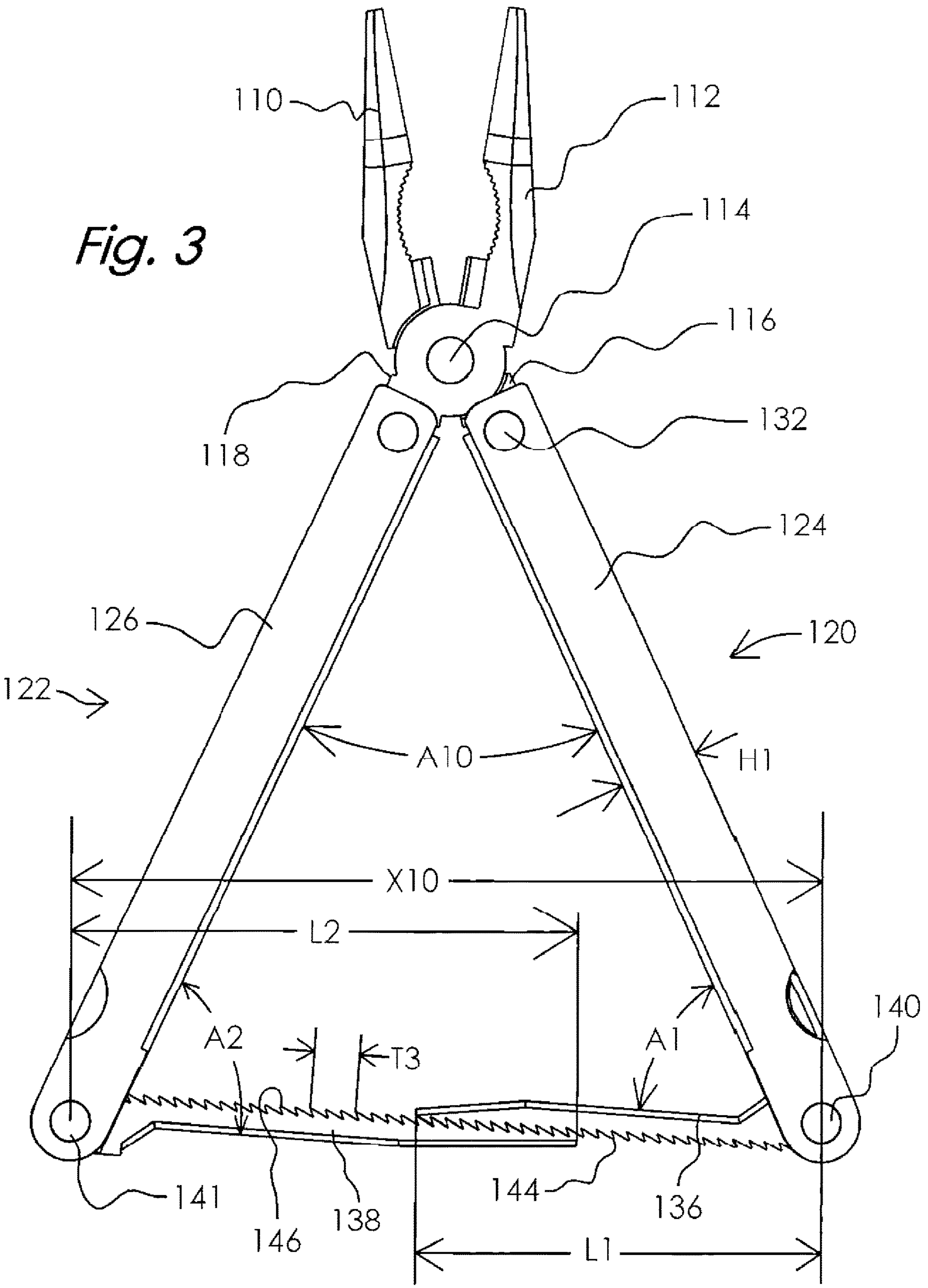
FIG. 3 is a side view of the multi-purpose tool shown in FIG. 1 depicting the tool in a locked configuration.

Referring now to FIG. 3, the pliers 100 may be utilized to clamp to objects of various sizes that fit between the pliers jaws 110, 112. The maximum separation of the jaws 110, 112 is limited by the maximum angle of separation A10 of the handles 120, 122. To accommodate operation of the pliers 100 through the full range of angles of separation of the handles 120, 122, the latching racks 136, 138 may not be of equal length. The optimum lengths of the latching racks 120, 122 may be calculated according to the following equations:

$$L2 = L1 + H1$$

$$(L2 - T3) + (L1 - T3) = X10$$

$$(L1 + H1 - T3) + (L1 - T3) = X10$$

X10=maximum separation of pliers handles at maximum angle of separation A10

H1=width of pliers handles

T3=distance between three adjacent rack teeth 114, 146

For the Following Values (Inches):

$$X10 = 4.75''$$

$$H1 = 0.575''$$

$$T3 = 0.25''$$

Solving for L1:

$$2*L1 = X10 - H1 + T3 + T3$$

$$2*L1 = X10 - H1 + 2*T3$$

$$L1 = (X10 - H1 + 2*T3)/2$$

$$L1 = (4.75 - 0.575 + 0.5)/2 \quad L1 = 2.34 \text{ inches}$$

$$L2 = 2.34 + 0.575 \quad L2 = 2.91 \text{ inches}$$

Figure 4:
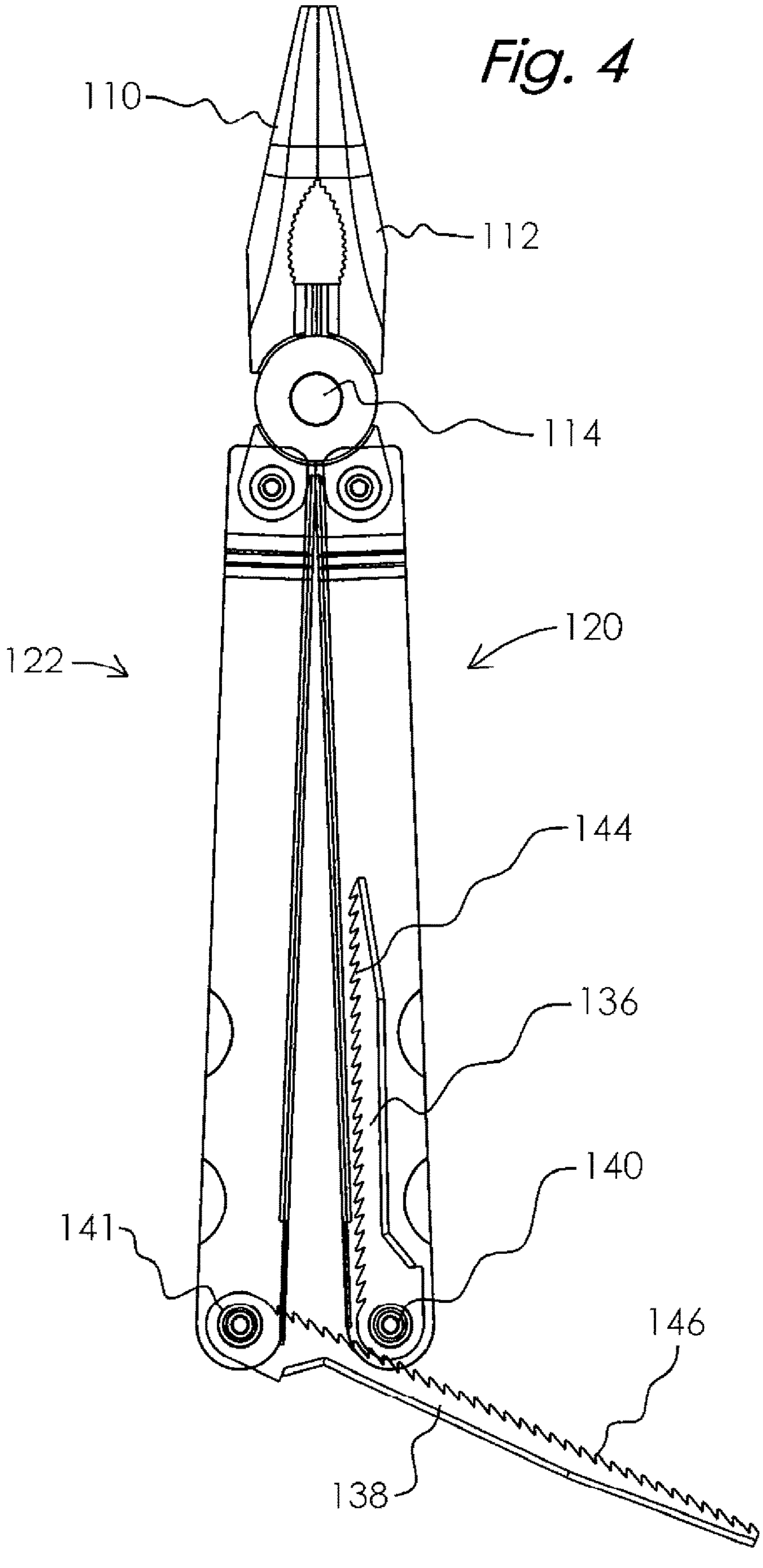
FIG. 4 is a side view of the multi-purpose tool shown in FIG. 1 depicting the tool in an alternate locked configuration.
Figure 5A:
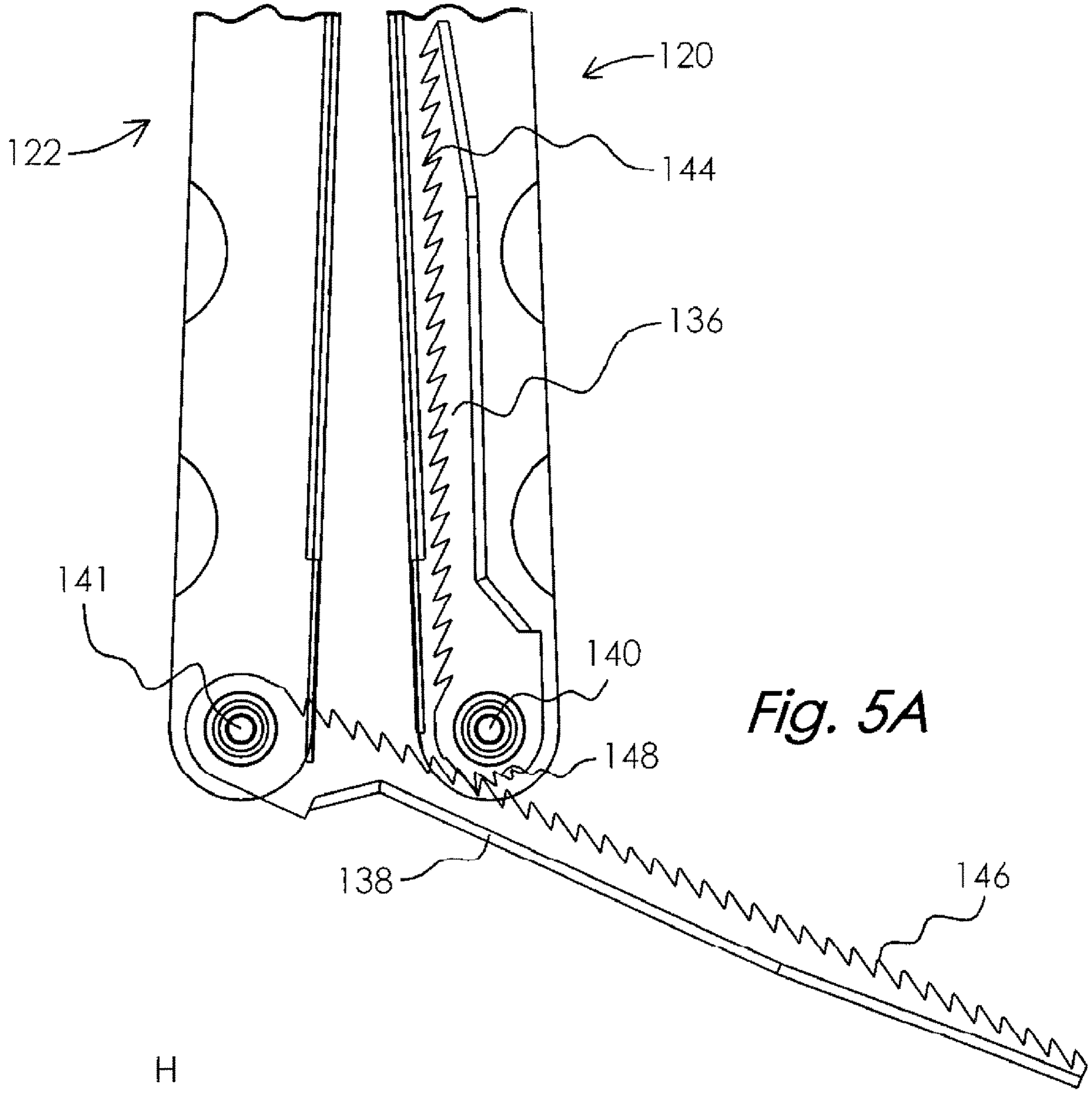
FIG. 5A is an enlarged partial side view of the distal end of the handles of the multi-purpose tool shown in FIG. 4.
Figure 5B:
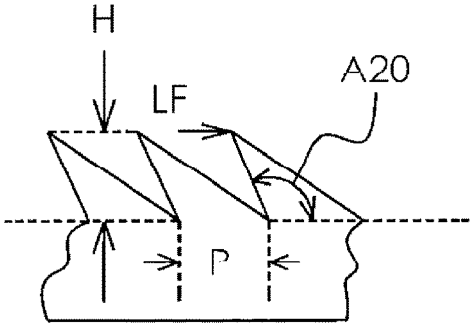
FIG. 5B is a partial, enlarged front view of the asymmetric profile of the rack teeth of the multi-purpose tool shown in FIG. 1.

Referring now to FIG. 4 and FIGS. 5A and 5B, the handles 120, 122 may be in close proximity when the multi-purpose tool 100 is clamped to an object relatively small in size. In such configuration, latching rack 136 may be stowed in the channel 142 in the handle 120. Latching rack 138 may be deployed to engage peripheral rack teeth 148 formed along a portion of the distal end of latching rack 136 movably secured to the handle 120 at pivot shaft 140. Latching rack 138 may be longer than latching rack 136 by about the width H1 of the handle 120 or about twenty percent longer than latching rack 136 for continuous and seamless latching transition ability within the full range of separation of the handles 120, 122.

Figure 6:
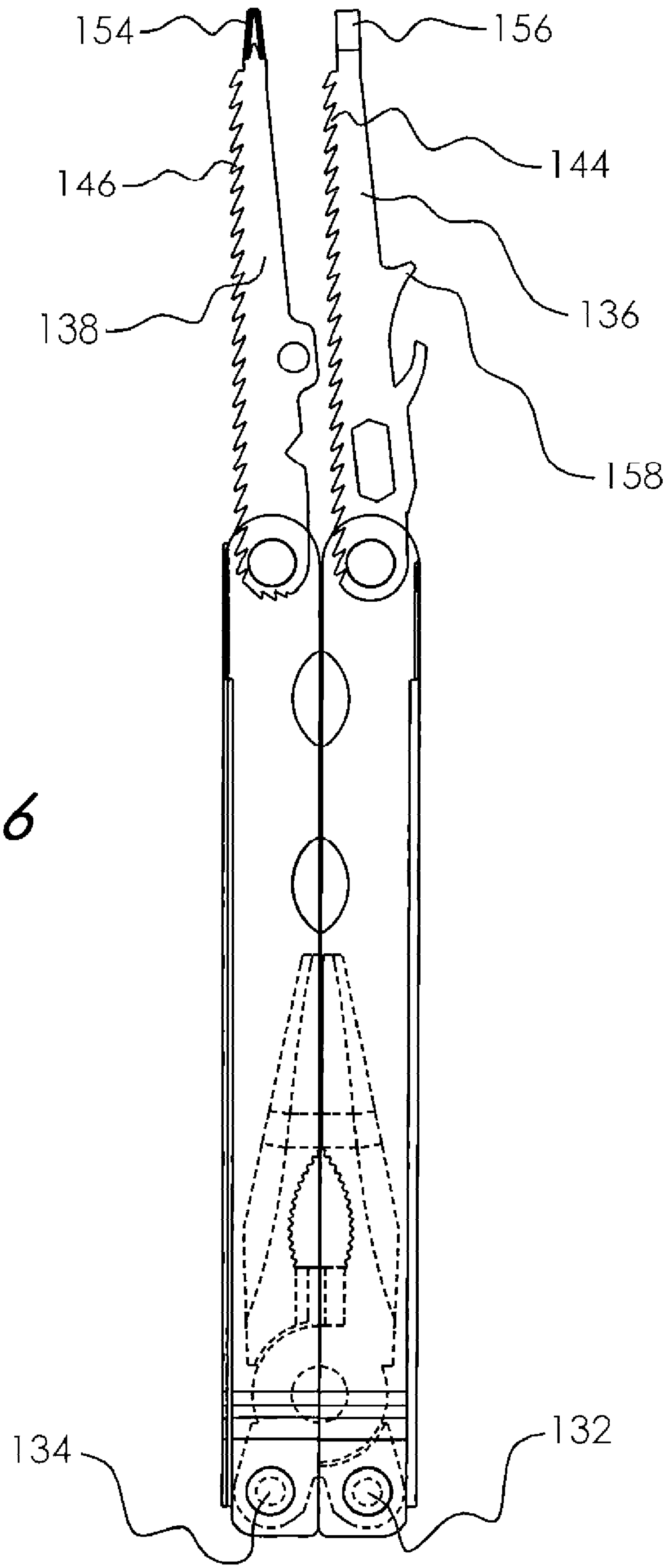
FIG. 6 is a side view of the multi-purpose tool shown in FIG. 1 illustrating latching racks provided with screwdriver tips.

Referring now to FIG. 6, a configuration of the pliers 100 is illustrated where the handles 120, 122 are rotated about 180 degrees about joints 132, 134, respectively, and the jaws 110, 112 are stowed in the channels 130 of the handles 120, 122. One or both of the latching racks 136, 138 may be rotated about pivot shafts 140, 141 to an orientation extending inline with the handles 120, 122, or at any angle relative to of the handles 120, 122 that may be desirable. In FIG. 6, for example, but without limitation, the latching racks 136, 138 have been rotated 180 degrees in an inline configuration with the handles 120, 122. The latching racks 136, 138 may include tool elements to perform various tasks. For example, but without limitation, the latching racks 136, 138 may include a Phillips screwdriver tip 154, a flat screwdriver tip 156, and bottle or can opener 158. Other tool implements, such as but without limitation, chisels, punches, awls, and the like may be incorporated in the latching racks 136, 138. Alternatively, rack teeth may be provided on an accessory tool implement instead of latching racks 136, 138. For example, but not limited to, rack teeth may be included along the spine (back) edge of a knife blade rotatably connected to one of the handles 120, 122 and a front of a file tool rotatably connected to the other handle 120, 122.

Figures 7A, 7B, 7C:
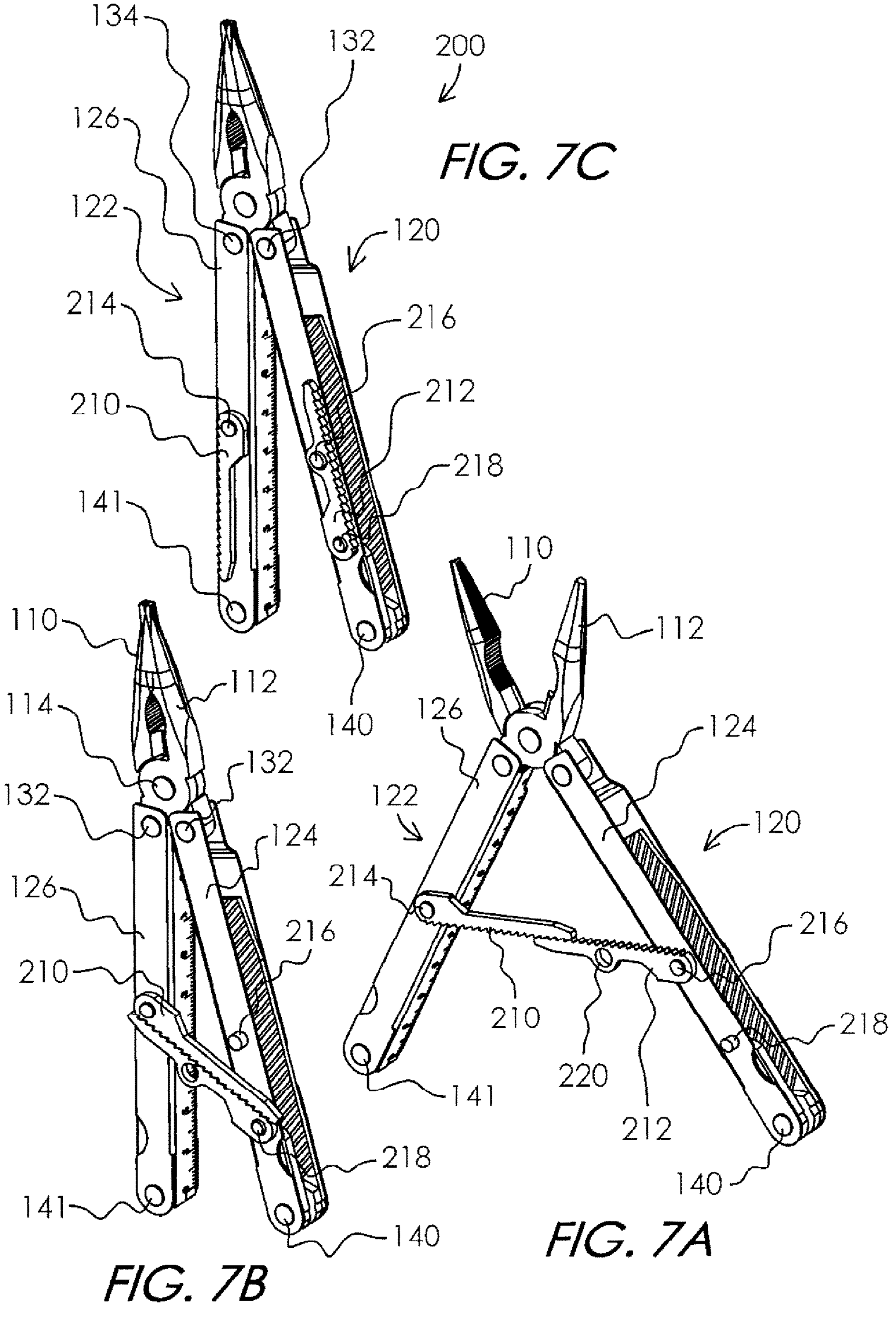
FIGS. 7A-7C are perspective views of a second embodiment of a multi-purpose tool.

Referring now to FIGS. 7A-7C, a second embodiment of a multi-purpose tool is generally identified by the reference numeral 200. As indicated by the use of common reference numerals the multi-purpose tool 200 is similar to the multi-purpose tool 100. The tool 200 may include latching racks 210 and 212 rotatably connected to the handles 120, 122 at an intermediate point between joints 132, 134 and pivot shafts 140, 141. Posts 214, 216 and 218 may project from the handles 120, 122, respectively. The posts 214, 216, 218 may define, without limitation, spring loaded connectors releasably connecting the latching racks 210, 212 to the handles 120, 122. In a first configuration shown in FIG. 7A, latching rack 210 may be rotatably connected to the handle 122 at post 214 and the latching rack 212 rotatably connected to handle 120 at post 216. In the first configuration shown in FIG. 7A, the handles 120, 122 may be separated to grasp relatively large objects between the jaws 110, 112. In a second configuration shown in FIG. 7B, latching rack 212 may be rotatably connected to the handle 120 at post 218 and latching rack 210 rotatably connected to handle 122 at post 214 to grasp relatively small object between the jaws 110, 112. When not in use, the latching racks 210, 212 may be moved to the stowed configuration shown in FIG. 7C. The latching rack 210 may be rotated about post 214 to a position parallel to the longitudinal axis of the handle 122 and in facing contact with the sidewall 126 thereof. The latching rack 212 may include a hole 220 sized to receive post 216. Latching rack 212 may be stowed in facing contact with the sidewall 124 of the handle 120 on the posts 216, 218.

Figures 8A, 8B, 8C:
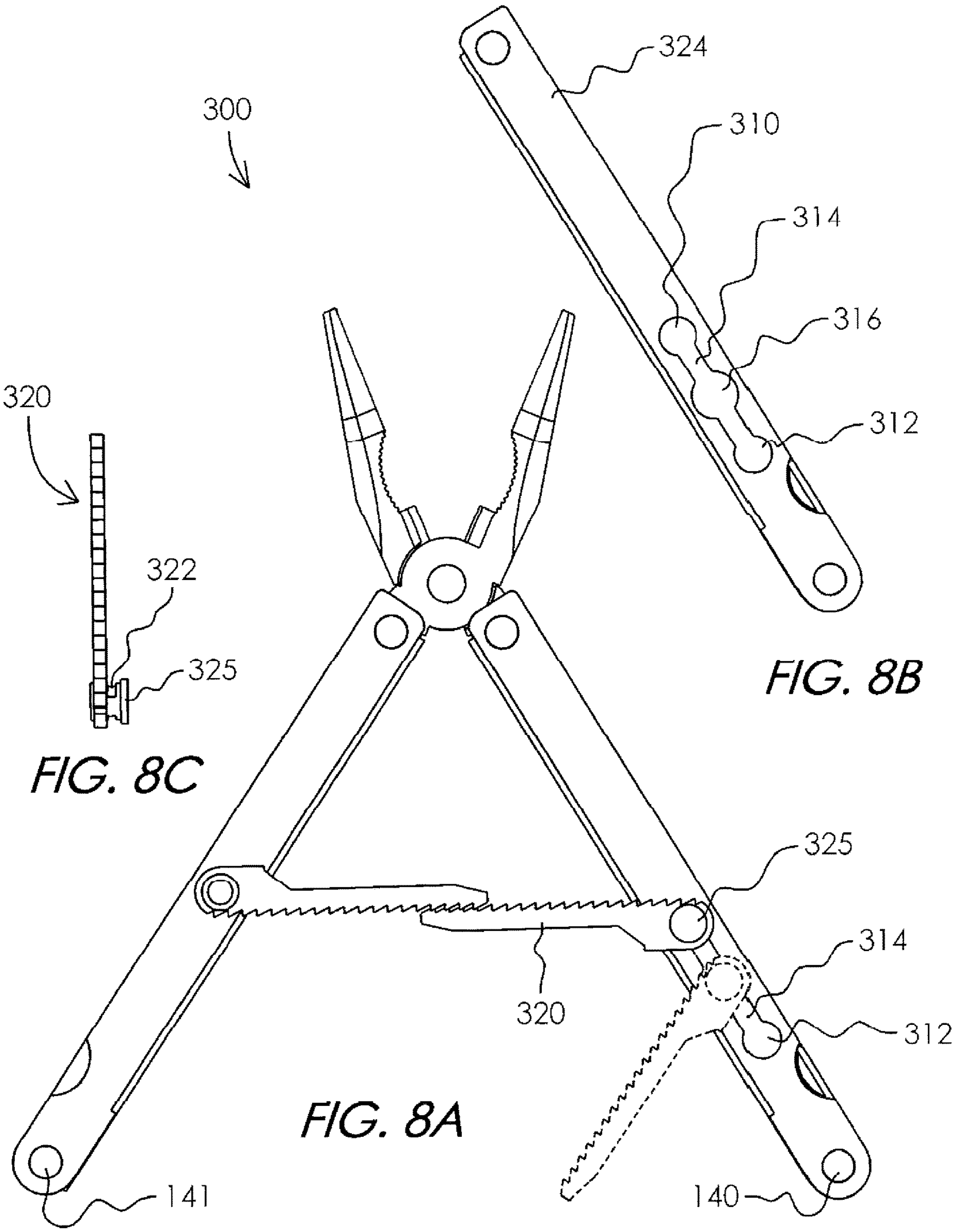
FIG. 8A is a side view of a third embodiment of a multi-purpose tool.
FIG. 8B is a side view of a handle of the multi-purpose tool shown in FIG. 8A.
FIG. 8C is a side view of a latching rack of the multi-purpose tool shown in FIG. 8A.

Referring now to FIGS. 8A-8C, a third embodiment of a multi-purpose tool is generally identified by the reference numeral 300. As indicated by the use of common reference numerals the multi-purpose tool 300 is similar to the multi-purpose tool 200, with the exception that the sidewall 324 of the handle 120 may include a pair of apertures 310 and 312 connected by a slot 314. An enlarged aperture 316 may be included between the apertures 310, 312 at about the mid-point of slot 314. This configuration provides a quick and easy transition to position latching rack 320 along the handle 120 for grasping relatively large and small objects. Latching rack 320 may include a stem 322 at a distal end thereof projecting substantially perpendicular to the surface of the latching rack 320. A flange 325 may be fixedly secured to the end of the stem 322. The flange 325 may be configured to pass through the aperture 316 but have a larger diameter than the apertures 310, 312. The stem 322 may be sized to slide though the slot 316.

Figure 9:
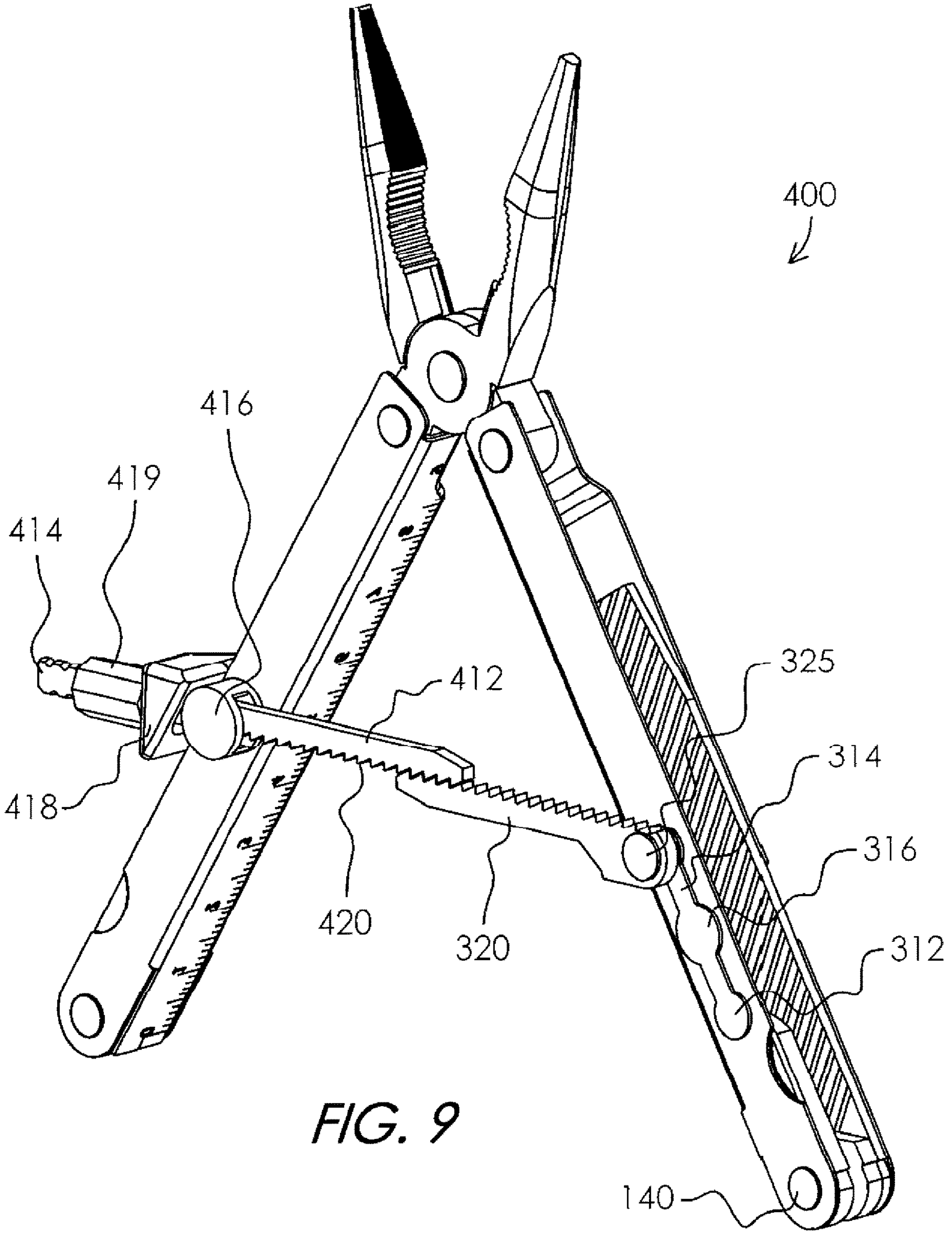
FIG. 9 is a perspective view of a fourth embodiment of a multi-purpose tool.

Referring now to FIG. 9, a fourth embodiment of a multi-purpose tool is generally identified by the reference numeral 400. As indicated by the use of common reference numerals, the multi-purpose tool 400 is similar to the multi-purpose tool 300. A latching rack 412 may comprise a planar body including asymmetric rack teeth 420 and a flattened threaded distal end 414. The latching rack 412 may be configured to pass through a guide 416 pivotally secured to the handle 122. A wedge-shaped thrust plate 418 may be disposed between the guide 416 and a knob 419 threaded on the distal end 414 of the latching rack 412. The knob 418 may be tightened to apply a tensile force interlocking the latching racks 320, 412.

Figure 10B:
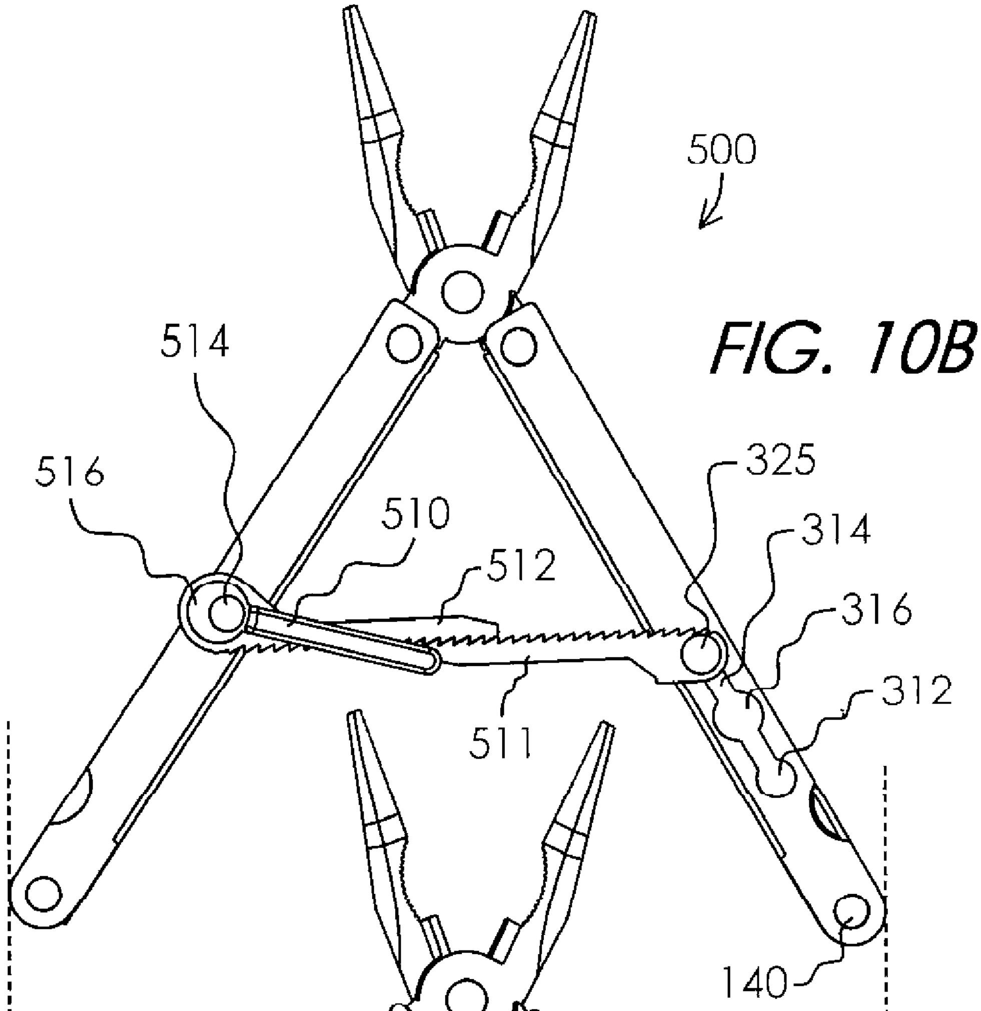
FIGS. 10A and 10B are side views of a fifth embodiment of a multi-purpose tool shown in locked and unlocked configurations.
Figure 10A:
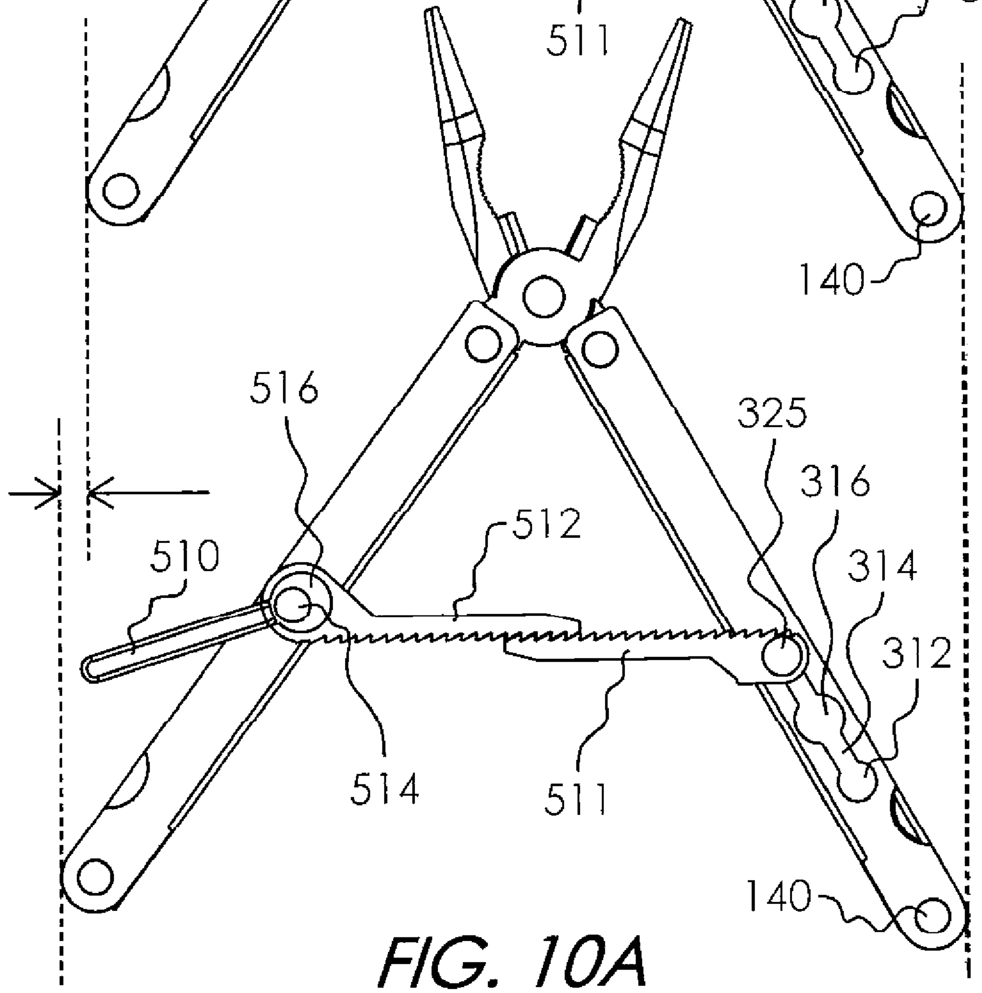

Referring now to FIGS. 10A and 10B, a fifth embodiment of a multi-purpose tool is generally identified by the reference numeral 500. As indicated by the use of common reference numerals, the multi-purpose tool 500 is similar to the multi-purpose tool 300. The tool 500 may include a cam lever 510 to apply a tensile force interlocking the latching racks 511 and 512. The cam lever 510 may be actuated to move latching rack 512 from a first position shown in FIG. 10A to a second eccentrically tightened position shown in FIG. 10B. A shaft 514 defines the rotational axis of eccentric journal 516. Latching rack 512 is rotatably secured to the eccentric journal 516. Rotation of the cam lever 510 about 180 degrees may draw the handles 120, 122 together by a distance S (illustrated by FIGS. 10A and 10B), and up to several latching teeth 114, 146.

Figure 11A:
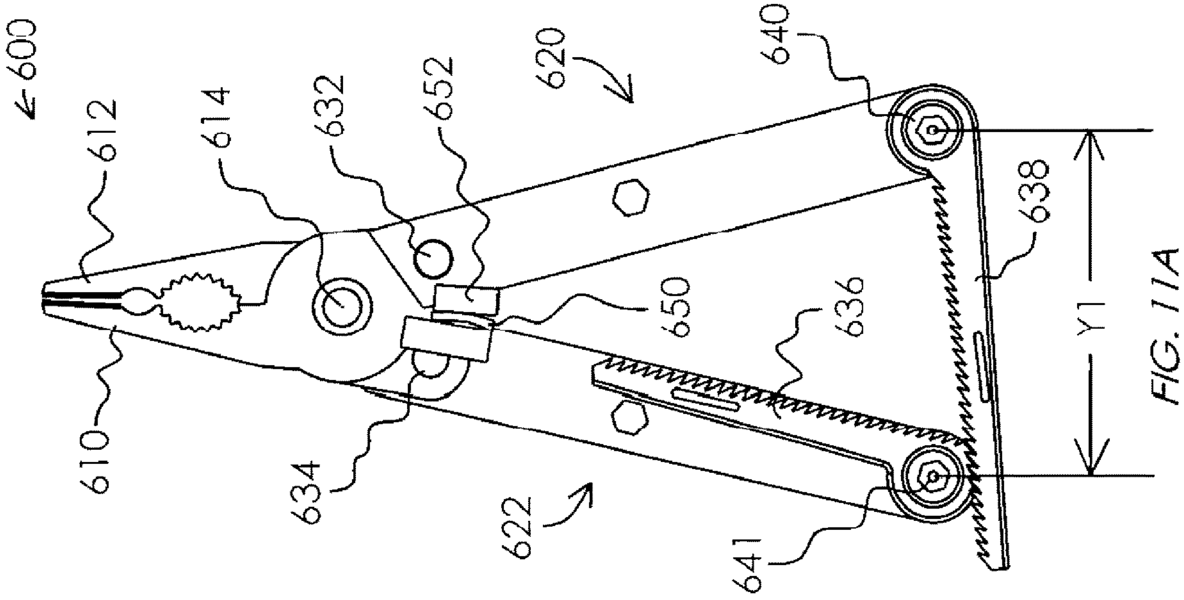
FIGS. 11A-11C are side views of a sixth embodiment of a multi-purpose tool.
Figure 11B:
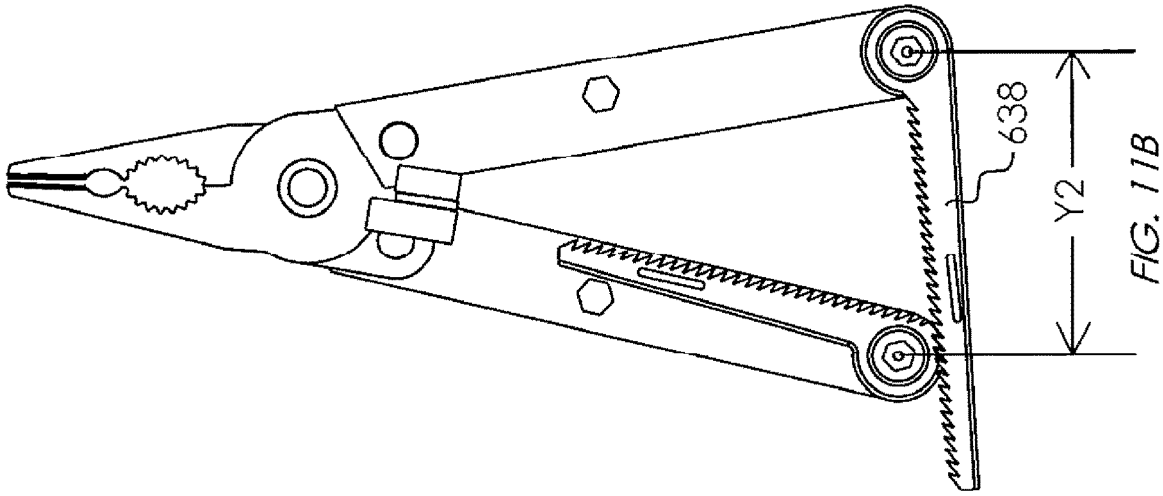
Figure 11C:
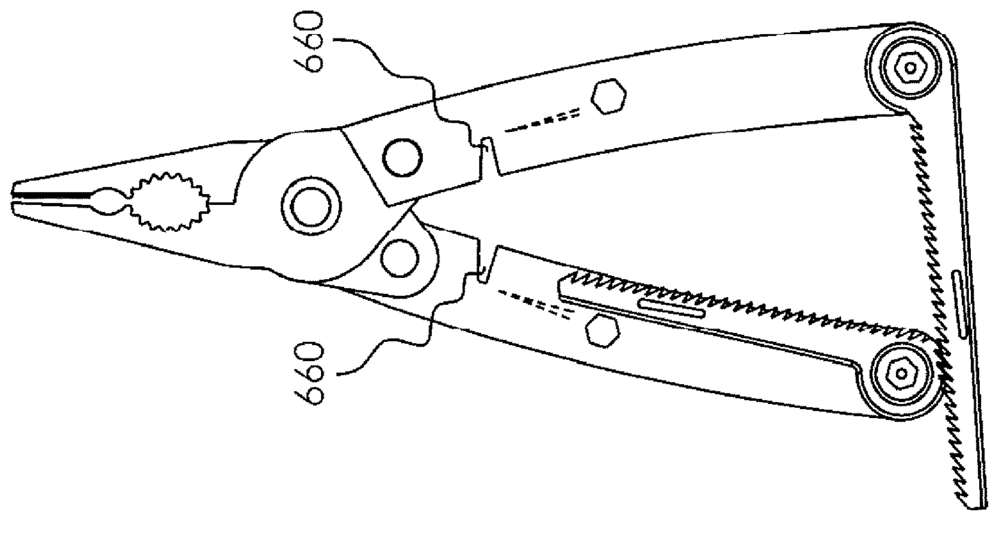

Referring now to FIGS. 11A-11C, a sixth embodiment of a multi-purpose tool is generally identified by the reference numeral 600. The multi-purpose tool 600 may include jaws 610 and 612 pivotally connected by a transverse pivot shaft 614. The first handle 620 may be rotatably secured to jaw 610 at joint 632, and the second handle 622 may be rotatably secured to jaw 612 at joint 634. Latching racks 636 and 638 may be pivotally connected proximate to the distal ends of the handles 620, 622, respectively, at pivot shafts 640 and 641. The latching racks 636, 638 may be stowed externally.

The handles 620, 622 may be very rigid and inflexible under the squeezing force that may be applied by a human hand. Flexibility may be provided by a leaf spring 650 captured between plates 652 secured between the jaw shanks of the jaws 610, 612. In the configuration shown in FIG. 11A, the leaf spring 650 is in a relaxed state, wherein the distance between the axes of pivot shafts 640, 641 may be a distance Y1 between handles 620,622. Upon squeezing the handles 620, 622, the leaf spring 650 may be compressed to a generally flat shape, shown in FIG. 11B. In the compressed configuration, the distance between the axes of pivot shafts 640, 641 may be a distance Y2 between the handles 620, 622. Upon release of the user's hand from the tool 600, the leaf spring 650 exerts a force against the jaw shanks of the jaws 610, 612 to apply a tensile force interlocking the latching racks 636, 638 to maintain the clamping force of the jaws 610, 612.

Referring now to FIG. 11C, one or both of the handles 620, 622 may be provided with notches 660 instead of the leaf spring 650 to provide sufficient flex in the handles 620, 622 to apply a tensile force interlocking the latching racks 620, 622.

Figure 12A:
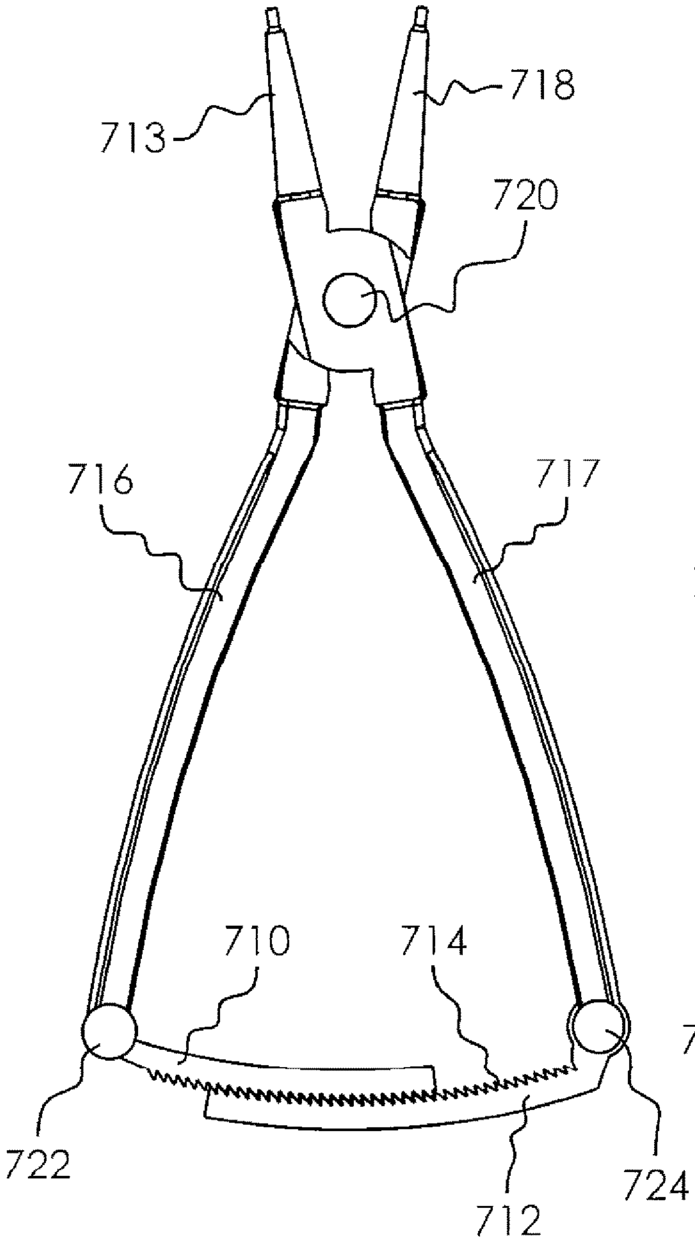
FIGS. 12A and 12B are side views of a seventh embodiment of a multi-purpose tool.
Figure 12B:
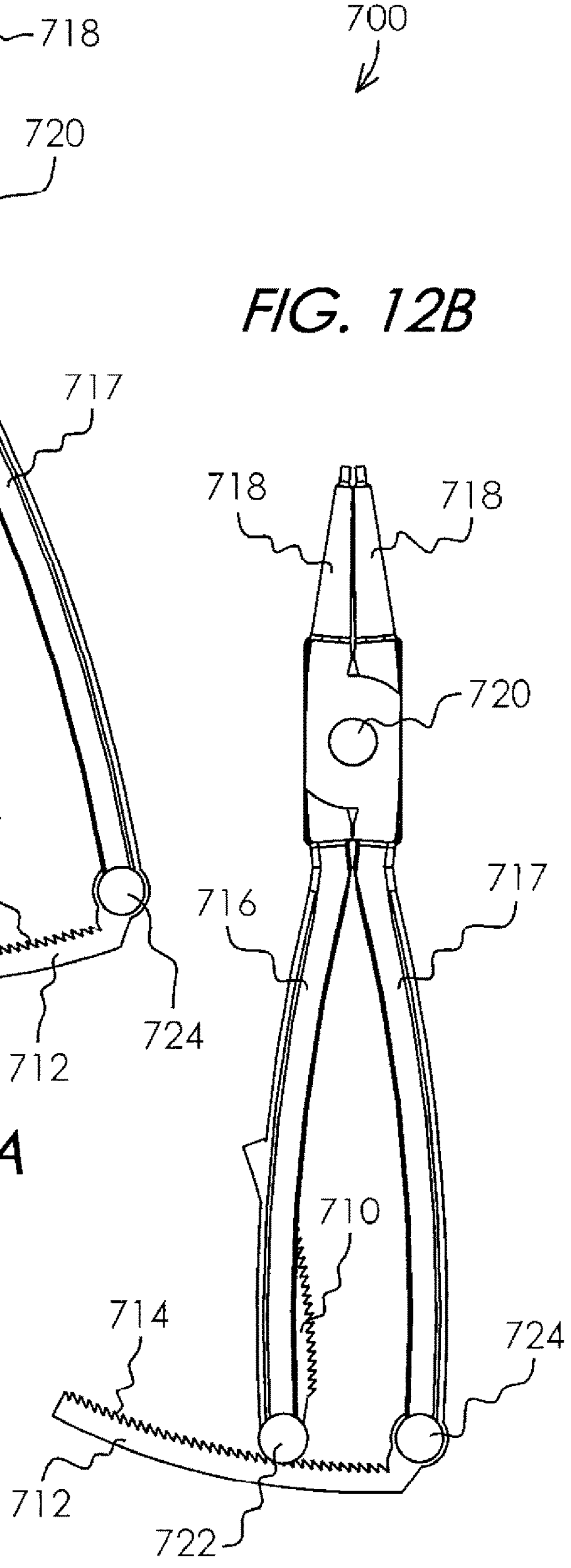

Referring now to FIG. 12A and FIG. 12B, a seventh embodiment of a multi-purpose tool is generally identified by the reference numeral 700. The multi-purpose tool 700 may include latching racks 710 and 712 having asymmetric teeth 714 allowing for mutual engagement of the latching racks 710, 712 in a non-linear manner. Handles 716 and 717 may be rigidly connected to pliers jaws 718 at pivot axle 720. Latching rack 710 may be rotatably connected to handle 716 at pivot shaft 722 and latching rack 712 may be pivotally connected to handle 712 at pivot shaft 724. In FIG. 12A, for illustrative purposes, the latching racks 710, 712 are deployed and engaged for gripping a relatively large object. In FIG. 12B, latching rack 710 is in the stored position and latching rack 712 may be deployed to engage peripheral rack teeth of the latching rack 710.

Figure 13A:
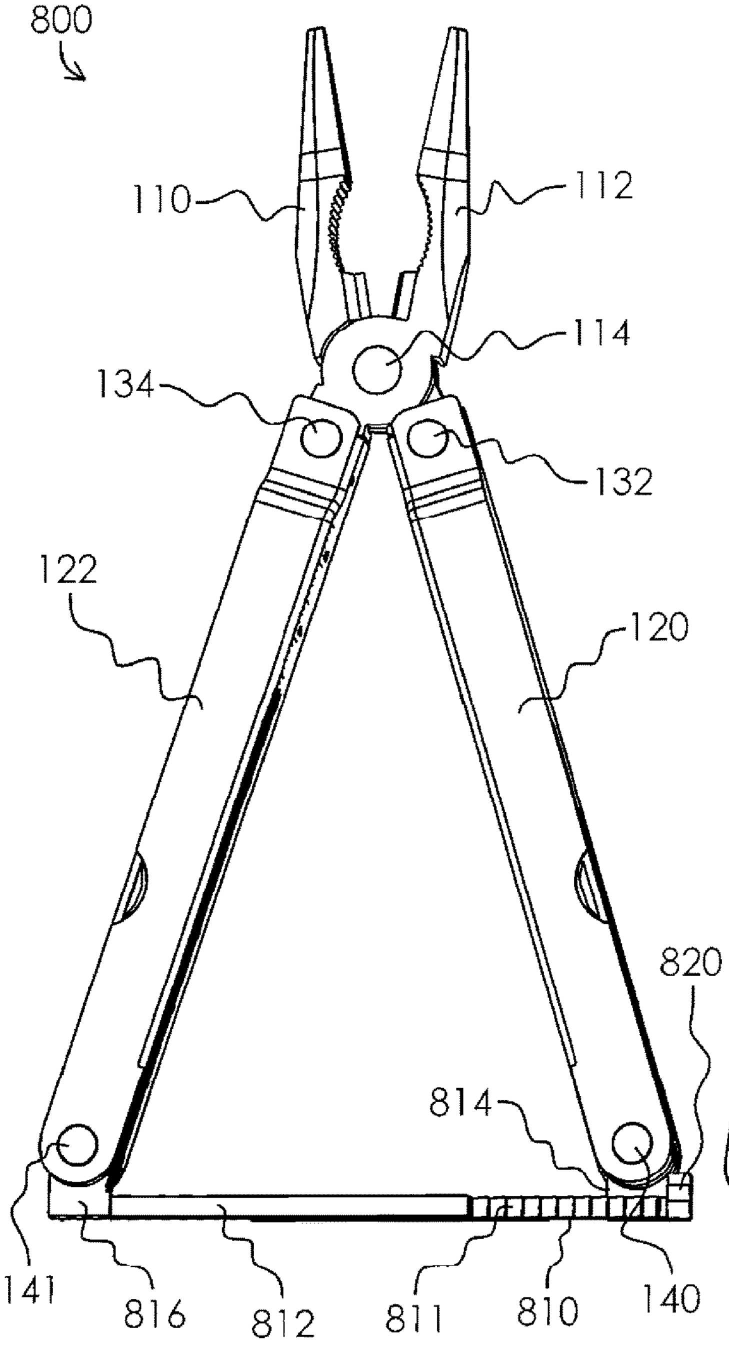
FIGS. 13A and 13B are side views of an eighth embodiment of a multi-purpose tool.
Figure 13B:
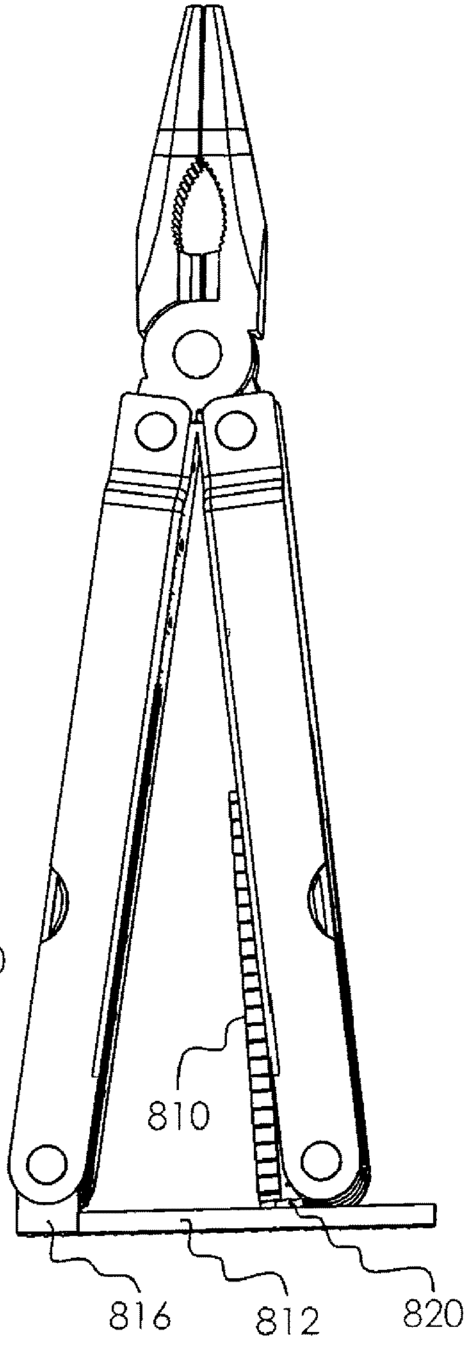

Referring now to FIGS. 13A and 13B, an eighth embodiment of a multi-purpose tool is generally identified by the reference numeral 800. As indicated by the use of common reference numerals the multi-purpose tool 800 is similar to the multi-purpose tool 100. The multi-purpose tool 800 may include latching racks 810 and 812 pivotally connected to pivot shafts 140 and 141, respectively. In a locked configuration, the rack teeth 811 of the latching racks 810, 812 may lie in a plane parallel to a horizontal plane passing through the rotational axis of pivot shafts 140, 141. Tabs 814 and 816 extending perpendicularly to a horizontal plane passing through latching racks 810, 812 may be projected from a distal end of the latching racks 810, 812, respectively. The tabs 814, 816 may include a through hole sized to receive pivot shafts 140, 141 therethrough rotatably connecting the latching racks 810, 812 to the handle 120, 122 of the multi-purpose tool 800. Small objects may be gripped by rotating the latching rack 810 to the stowed position shown in FIG. 13B and engagement of the latching rack 812 with secondary teeth 820 projecting from an edge of the tab 814.

Figures 14, 15, 16, 17:
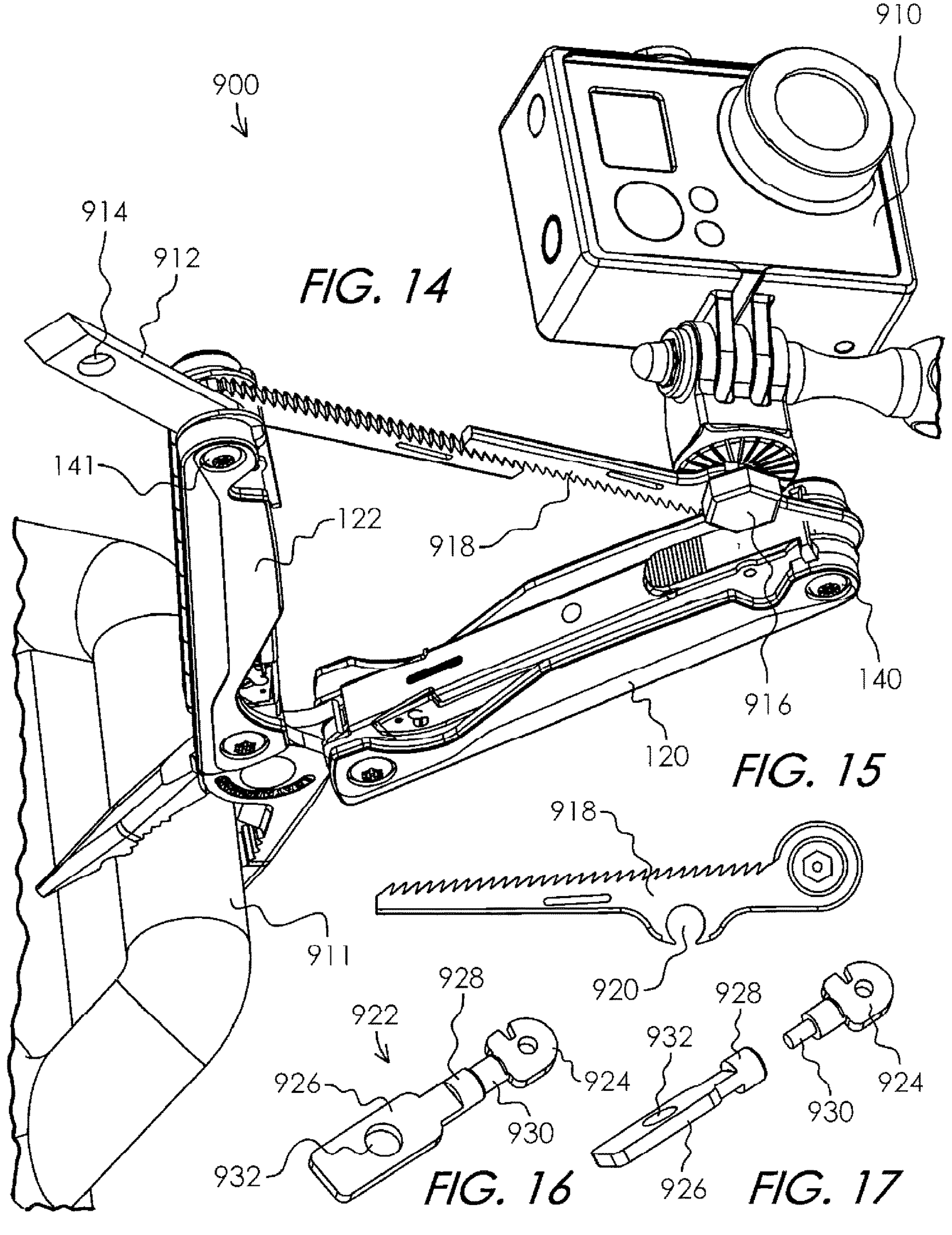
FIG. 14 is a perspective view of a nineth embodiment of a multi-purpose tool featuring a camera mount.
FIG. 15 is a side view of a latching rack for the multi-purpose tool shown in FIG. 14.
FIG. 16 is a perspective view of a camera mount for the multi-purpose tool shown in FIG. 14.
FIG. 17 is an exploded perspective of the camera mount shown in FIG. 16.

Referring now to FIG. 14, a nineth embodiment of a multi-purpose tool is generally identified by the reference numeral 900. As indicated by the use of common reference numerals the multi-purpose tool 900 is similar to the multi-purpose tool 100, with the exception that the multi-purpose tool 900 may include means for mounting a camera 910 on the multi-purpose tool 900. A camera mount tool member 912 may include a hole 914 sized to receive a camera mounting bolt 916. For example, but without limitation, the diameter of hole 914 may be ¼ inch to accommodate a ¼ inch bolt 916 required by most cameras. In an alternate configuration shown in FIG. 15, one or both of the latching racks 918 may include a hole 920 sized to receive the camera mounting bolt 916. The camera mounting hole 920 may define a partial hole having a peripheral opening. The camera mounting hole 920 may be of sufficient shape and size to prevent the bolt 914 from sliding laterally out of hole 918.

During use, the multi-purpose tool 900 may be clamped to a fixed structure 921 supporting the camera 910 to take photographs. Camera tilt capability may be provided by a camera mount 922, shown in FIG. 16, secured to the handles 120, 122 at pivot shafts 140 or 141. The camera mount 922 may include a head portion 924 and a planar portion 926. The head portion 924 may be rotatably secured to the pivot shafts 140, 141. The planar portion 926 may include a hub 928 forming a friction fit connection with a shaft 930 projection from the head portion 924. Alternatively, shaft 930 may be threaded to the hub 928. The planar portion 926 may include a hole 932 to receive the camera mounting bolt 916 securing the camera 910 to the multi-purpose tool 900.

The camera 910 may be moved in horizontal and vertical planes to a desired position to take photographs.

While a preferred embodiment of the invention has been shown and described, other and further embodiments of the invention may be devised without departing from the basic scope thereof, and the scope thereof is determined by the claims which follow.

The invention claimed is:

1. A multi-purpose tool, comprising:

a) a first handle;

b) a second handle;

c) a first jaw pivotally connected to said first handle;

d) a second jaw pivotally connected to said second handle;

e) said first handle and said second handle pivotally secured together at a transverse pivot shaft;

f) a first latching rack and a second latching rack rotatably connected about a pivot shaft proximate to a distal end of respective said first handle and said second handle, each said first latching rack and said second latching rack defining an elongated planar body;

g) said first latching rack and said second latching rack including asymmetric teeth along an edge of each said elongated planar body.

2. The multi-purpose tool of claim 1 wherein said first latching rack and said second latching rack are of unequal length.

3. The multi-purpose tool of claim 1 further including peripheral rack teeth along a portion of a distal end of one of said first latching rack and said second latching rack.

4. The multi-purpose tool of claim 1 wherein one of said first handle and said second handle include a pair of spaced apart apertures connected by a slot, and further including an enlarged aperture between said pair of apertures.

5. The multi-purpose tool of claim 4 wherein said second latching rack includes a protrusion sized to be received by said enlarged aperture.

6. The multi-purpose tool of claim 5 wherein said second latching rack comprises a planar body, said body including a flattened threaded distal end, said latching rack configured to pass through a guide pivotally secured to said second handle.

7. The multi-purpose tool of claim 6 further including a thrust plate disposed between said guide and a knob threaded to said second latching rack.

8. The multi-purpose tool of claim 5 including a cam lever pivotally secured to said second handle through a hole extending through a distal end of said second latching rack.

9. The multi-purpose tool of claim 1 further including a leaf spring disposed between jaw shanks of said first jaw and said second jaw.

10. The multi-purpose tool of claim 1 wherein said first latching rack and said second latching rack include a pitch radius for engagement of said first latching rack and said second latching rack in a non-linear manner.

11. The multi-purpose tool of claim 1 wherein said asymmetric teeth define a tooth profile in a horizontal plane.

12. The multi-purpose tool of claim 1 further including a camera mounting member having a hole for receiving a camera mounting bolt to secure a camera.

13. The multi-purpose tool of claim 1 wherein one of said first and second latching racks include a hole for receiving a camera mounting bolt to secure a camera.

14. The multi-purpose tool of claim 1 further including a camera mount providing camera tilt capability.

15. The multi-purpose tool of claim 1 wherein said first handle and said second handle each include sidewalls and a bottom wall defining an outwardly facing longitudinal channel.

16. The multi-purpose tool of claim 1 wherein said asymmetric teeth define an asymmetric profile establishing a negative pressure angle between rack teeth cooperatively engaging under tension.

17. A multi-purpose tool, comprising:

a) a first handle;

b) a second handle;

c) a first jaw secured to said first handle;

d) a second jaw secured to said second handle;

e) said first handle and said second handle pivotally secured together at a transverse pivot shaft;

f) a first latching rack and a second latching rack rotatably connected about a pivot shaft proximate to a distal end of respective said first handle and said second handle, each said first latching rack and said second latching rack comprises an elongated planar body;

g) said first latching rack and said second latching rack each including asymmetric rack teeth defining an asymmetric profile, said rack teeth extending along an edge of a respective said planar body.

18. The multi-purpose tool of claim 17 wherein said first latching rack and said second latching rack define curved profiles for cooperative engagement in a non-linear manner.

* * * * *